(12) United States Patent
Tanaami et al.

(10) Patent No.: US 6,300,618 B1
(45) Date of Patent: Oct. 9, 2001

(54) HIGH SPEED 3-DIMENSIONAL CONFOCAL MICROSCOPIC EQUIPMENT

(75) Inventors: Takeo Tanaami; Shinichiro Kawamura, both of Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 09/209,580

(22) Filed: Dec. 11, 1998

(30) Foreign Application Priority Data

Dec. 12, 1997 (JP) ................................................. 9-342538

(51) Int. Cl.⁷ ............................................................ G02B 7/02
(52) U.S. Cl. ......................... 250/216; 250/201.3; 359/823
(58) Field of Search .................................. 250/216, 201.2, 250/201.3, 201.4, 234, 205; 359/209, 210, 368, 385, 376, 389, 813, 823, 824

(56) References Cited

U.S. PATENT DOCUMENTS 4,863,252 * 9/1989 McCarthy et al. ................... 359/389

5,995,867 * 11/1999 Zavislan et al. ..................... 600/476

FOREIGN PATENT DOCUMENTS 3-134607 * 6/1991 (JP) ................................. 250/201.3

* cited by examiner

*Primary Examiner*—John R. Lee
*Assistant Examiner*—Kevin Pyo
(74) *Attorney, Agent, or Firm*—Moonray Kojima

(57) ABSTRACT

Confocal microscope equipment which provides real time 3-dimensional display by scanning at high speeds in the direction of the optical axis, wherein sliced images of a sample are obtained by scanning the sample surface with a light beam using a confocal scanner having an objective lens actuator which scans the objective lens in the optical axis direction faster than a one image integrating time when photographing the slice images with an image pickup device or when observing the sliced images direction with the naked eye.

9 Claims, 4 Drawing Sheets

(a)

(b)

(a)   (b)

- 30: Camera
- 20: Confocal Scanner
- 10: Optical Microscope
- 11: Sample
- 12: Stage
- 13: Controller
- 50: Laser Light Source
- 60: Computer

HIGH SPEED 3-DIMENSIONAL CONFOCAL MICROSCOPIC EQUIPMENT

BACKGROUND OF THE INVENTION

1. Field of Invention

The present invention relates to confocal microscopic equipment that displays an object under test in three-dimensional form using a confocal microscope. More precisely, the present invention relates to an improvement for optical production of real-time three-dimensional displays of an object by realizing high resolution and large depth of focus in real-time at high speed.

2. Description of the Prior Art

FIG. 7 shows an example of the conventional type of confocal microscopic equipment. The equipment captures an image of sample 11 using confocal scanner 20 mounted on optical microscope 10 and takes photographs of this image with camera 30. To confocal scanner 20, the laser beam generated from laser light source 50 is supplied.

The output signal of camera 30 is converted to a digital signal through converter 40 and stored in a memory means (not shown in the figure) in computer 60.

In optical microscope 10, stage 12 on which sample 11 is mounted is built to be movable in the optical axis direction (Z-axis direction) by controller 13 (illustrated separately from optical microscope 10 in FIG. 7 to avoid complication). Controller 13 is constructed to move stage 12 in the Z-axis direction by turning the rotary knob (not shown in the figure) of stage 12 using a pulse motor (not shown in the figure).

Sliced images of sample 11 can be obtained by scanning the beam in directions perpendicular to the optical axis (X- and Y-axis directions) using confocal scanner 20. In this case, if multiple sliced images are sampled progressively by moving stage 12 in the Z-axis direction with controller 13 and then are reconstructed using computer 60, a three-dimensional image of sample 11 can be obtained.

However, there are the following problems in confocal microscopic equipment constructed as described above:

(1) Problems caused by the fact that controller 13 is driven by a pulse motor.
  (a) The entire body of stage 12 is moved up and down. However, since the weight of stage 12 is heavy and thus its inertia is also large, stage 12 cannot be moved at high speed and so its movement takes a long time.
  (b) It is not accurate. Since the rotary knob of stage 12 is turned by a pulse motor, out-of-step (the pulse motor appears to move but actually does not move) or hysteresis occurs during motion at the rack-pinion portion linking the rotary knob to stage 12. Hence, it is not known whether stage 12 has actually moved and so the movement is not accurate.
  (c) Usually, a pulse motor has a large external size and is difficult to install.
(2) Problems caused by reconstructing a three-dimensional image with computer 60.
  (a) It takes a long time; it typically takes from several minutes to tens of minutes to obtain an image sheet.
  (b) Software for reconstructing three-dimensional images is expensive and is also difficult to operate.

SUMMARY OF THE INVENTION

The objective of the present invention is to solve the problems described above in providing confocal microscopic equipment in which scanning in the optical axis direction is performed at high speed and the real-time three-dimensional image can be easily displayed.

In order to solve those problems, the invention is characterized by confocal microscopic equipment that can capture sliced images of a sample by scanning the sample surface with a light beam using a confocal scanner as shown below. The confocal microscopic equipment comprises an objective lens actuator that scans the objective lens in the optical axis direction faster than the one-image integrating time when photographing the above sliced images with an image pickup device or when observing the above sliced images directly with the naked eye.

In the invention, the objective lens is scanned in the optical axis direction with the objective lens actuator provided in the confocal microscopic equipment. In this case, the objective lens is scanned faster than the one-image integrating time when the one-image is observed by an image pickup device or the naked eye. This allows images of large depth of focus to be seen in real-time and so real-time three-dimensional display of samples can be achieved.

DETAILED DESCRIPTION OF THE PREFERRED EMBODIMENTS

Figure 1:
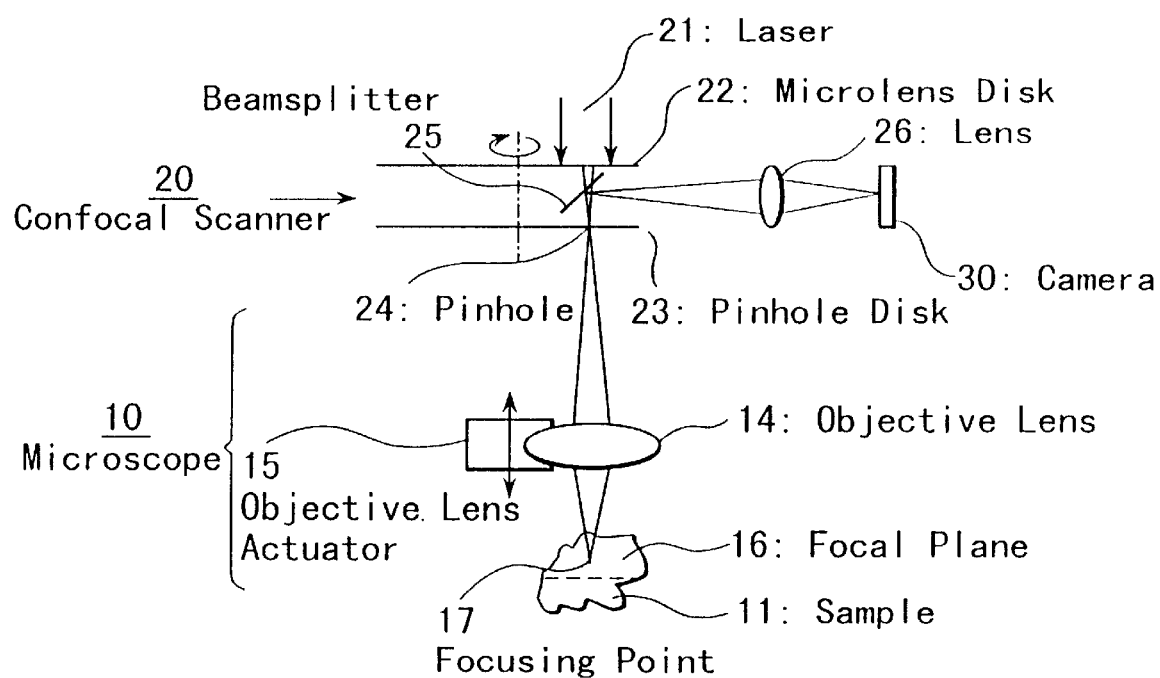
FIG. 1 shows the configuration of an essential part of an embodiment for the confocal microscopic equipment in accordance with the present invention.

The present invention will be described below in detail using the drawings. FIG. 1 shows the configuration of an essential part of an embodiment for the confocal microscopic equipment in accordance with the present invention. In FIG. 1, the part of confocal scanner 20 has the well-known configuration and comprises microlens disk 22, pinhole disk 23, beam splitter 25 and lens 26.

Normally, a plurality of microlenses (not shown in the figure) are arranged in microlens disk 22 and formed to focus light beam (herein laser beam is used) 21 on each pinhole (a plurality of pinholes are arranged) in pinhole disk 23. Pinhole disk 23 is linked to microlens disk 22 in parallel and is designed to be able to rotate around the same shaft integral with microlens disk 22 at the same speed. Light beams emitted from pinhole disk 23 being rotated in a plane perpendicular to the optical axis (X- and Y-axis plane) are incident to microscope 10 and scanned over the surface of sample 11.

Beam splitter 25 is located between microlens disk 22 and pinhole disk 23 and reflects the return light from microscope 10. This return light is incident to the image-receiving surface of an image pickup device (for example, camera 30) through lens 26.

Objective lens actuator 15 is provided in microscope 10 to be able to move objective lens 14 in the optical axis direction (Z-axis direction). Objective lens actuator (hereinafter simply called actuator) 15 can be constructed, for example, with a piezoelectric element and its driving means that can freely move objective lens 14 in the Z-axis direction by driving the piezoelectric element with external driving signals.

The operations of a system configured as mentioned above will be described below. Laser beam 21 is focused on pinholes 24 on pinhole disk 23 by microlenses in microlens disk 22. Laser beams transmitted through pinholes 24 focus on focusing point 17 on focal plane 16 on sample 11 located in a position conjugate with pinhole disk 23 by means of objective lens 14.

Focal plane 16 on sample 11 is optically scanned by the rotation of microlens disk 22 and pinhole disk 23. The return light beam from the sample surface is again transmitted through objective lens 14 and pinhole disk 23, then return with beam splitter 25, and finally forms an image on the image reception plane of camera 30 through lens 26.

In this case, objective lens 14 is driven with actuator 15 and the sliced images in positions $Z_1, Z_2, Z_3, \ldots Z_n$ in the direction of depth of objective lens 14 are photographed with camera 30 over one period of the drive.

Figure 2:
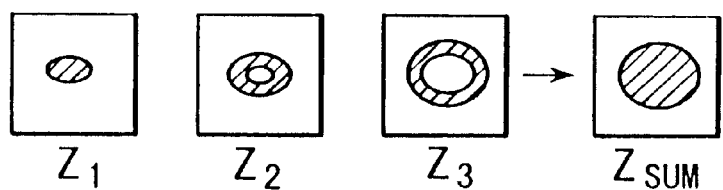
FIGS. 2(a) and 2(b) show illustrative drawings of sliced images.
Figure 2:
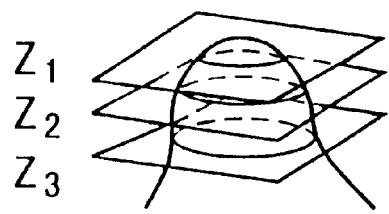

FIG. 2 shows illustrative drawings of the above sliced images. In FIG. 2, drawing (a) presents each sliced image in the Z-axis direction and drawing (b) indicates the relationship between the sample and each slicing plane. In addition, $Z_{sum}$ in in drawing (a) of FIG. 2 represents the resultant image obtained by superimposing sliced images of $Z_1, Z_2, Z_3, \ldots Z_n$.

In this case, each sliced image is obtained by scanning objective lens 14 faster than one-image integrating time when one image is viewed with a camera or the naked eye.

If camera 30 is herein operated by the National Television System Committee (NTSC) scheme (30 pictures/second) and objective lens 14 is moved at 30 Hz f or a stroke of $Z_1, Z_2, Z_3, \ldots Z_n$, the resultant image of $Z_1, Z_2, Z_3, \ldots Z_n$ can be photographed in real-time with camera 30. This resultant image can also be observed in real-time by viewing it with the naked eye in place of camera 30.

Further, although large depth of focus can be obtained also in conventional non-confocal microscopes, they can produce only wholly unclear, faded images. Confocal microscopes have an advantage that clear images (sliced images) that are wholly in focus are obtained.

Furthermore, since only sliced images can be viewed with a confocal microscope, in the initial positioning step, first the entire object is viewed using a non-confocal image and then the microscope is optically switched to the confocal system. However, positioning according to the present invention has another advantage in that it is managed only by the switching of electrical signals that control the start and stop of actuator 15.

Figure 3:
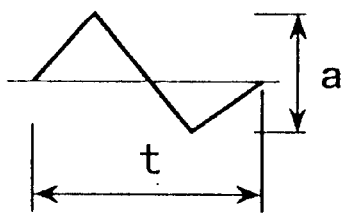
FIG. 3 shows a drawing as an example of movement of the objective lens.

In addition, since objective lens 14 is moved so as to go and return (deflection amplitude a of the objective lens) in one period (time t) as shown in FIG. 3, two resultant images can be obtained in one period. Thus, there is virtually no problem if objective lens 14 is designed to move at 15 Hz. In general, the scanning time may be taken as an integer multiple of the image integrating time.

It may also be suitable that the beam is always focused at the position of focus of objective lens 14 even if the objective lens is moved up and down by insertion of a tube lens between pinhole disk 23 and objective lens 14.

Figure 4:
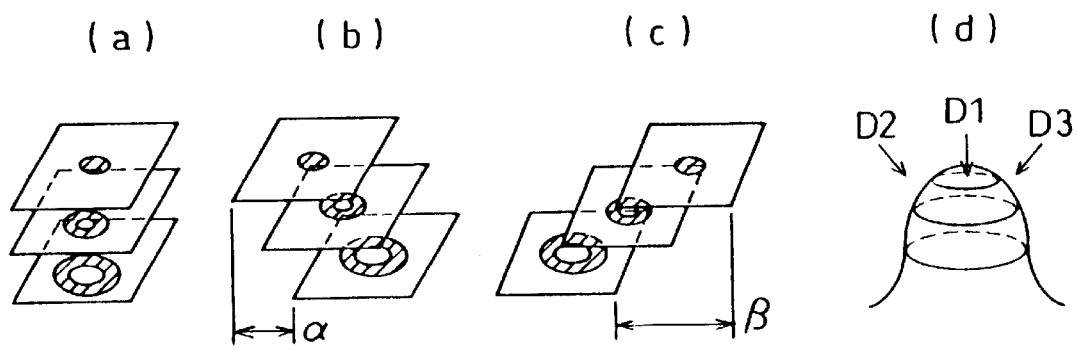
FIGS. 4(a)–4(d) show illustrative drawings in the case where the stage is moved in a direction transverse to the optical axis.
Figure 7:
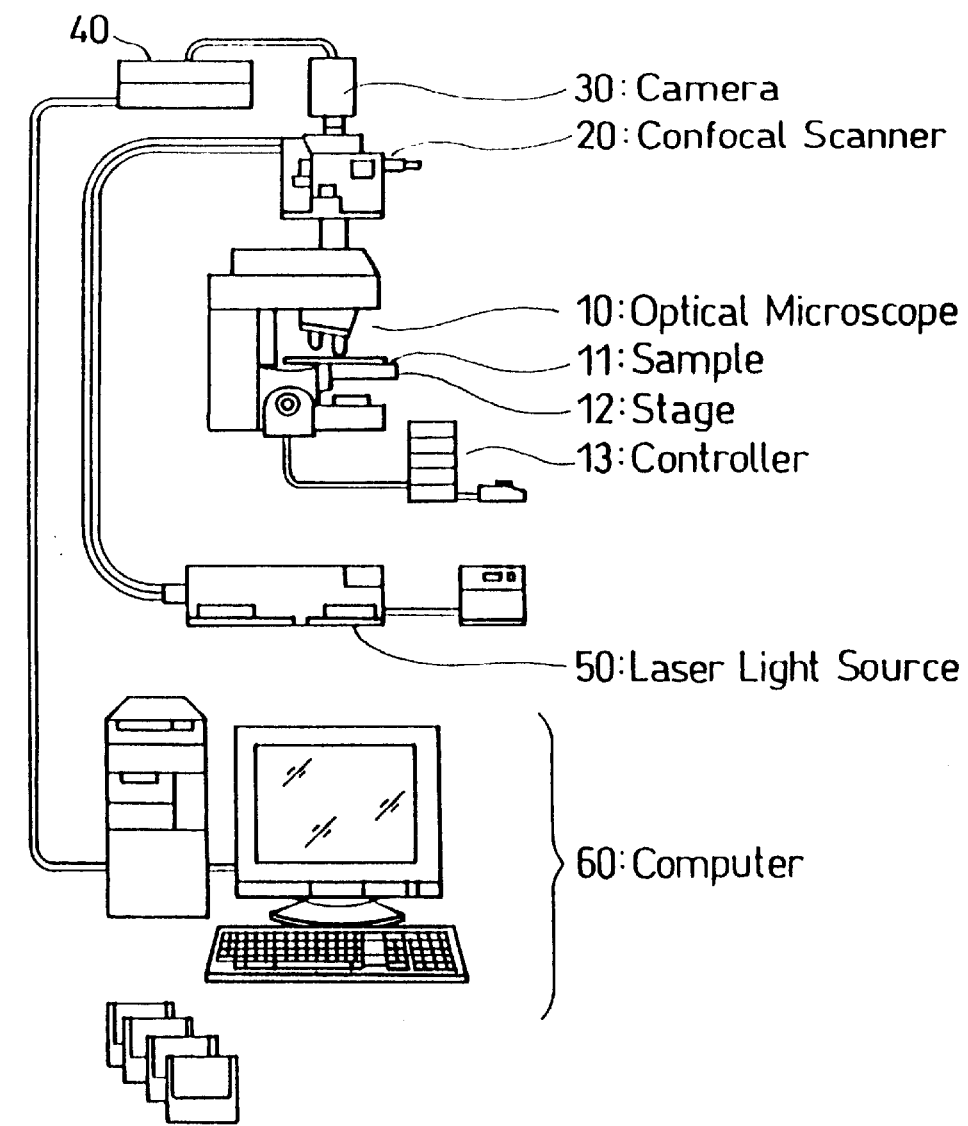
FIG. 7 shows a drawing of the configuration of an example of conventional confocal microscopic equipment.

Further, by moving stage 12 (refer to FIG. 7) in synchronization with the above action in the direction perpendicular to the optical axis (transverse direction), an integrated image of sample 11 viewed obliquely can be obtained. Drawings (a), (b) and (c) of FIG. 4 show sliced images and drawing (d) of FIG. 4 indicates the external view of the sample. Drawing (a) of FIG. 4 shows the sliced images viewed from directly above (in the direction of D1 in drawing (d) of FIG. 4) sample 11 with stage 12 fixed to the initial position. Drawing (b) of FIG. 4 shows the sliced images viewed by moving stage 12 to the right (viewed in the direction of D2 in drawing (d) of FIG. 4). Drawing (c) of FIG. 4 shows the sliced images viewed by moving stage 12 to the left (viewed in the direction of D3 in drawing (d) of FIG. 4).

As described above, images when sample 11 is viewed obliquely can be obtained in real-time by scanning stage 12 transversely.

If the above Z-direction scanning is herein implemented at 30 Hz and the variation from drawing (a) to drawing (c) in FIG. 4 is carried out at, for example, about 1 Hz, sample 11 appears to be slowly deflected to the right and left. Thus, a stereoscopic impression is obtained through dynamic stereoscopic vision. In this case, the object to be moved in the transverse direction described above is not limited to sample 11 but transverse movement of any of the objective lens, tube lens, confocal scanner or camera provides similar results. In short, the above result can be obtained by changing the relative positions between the sample and image pickup device in the transverse direction.

In addition, the intensity of the laser beam or sensitivity of camera 30 may also be increased or decreased corresponding to movement in the Z-axis direction by providing a control mechanism that can control the intensity of the laser beam or sensitivity of camera 30.

Figure 5:
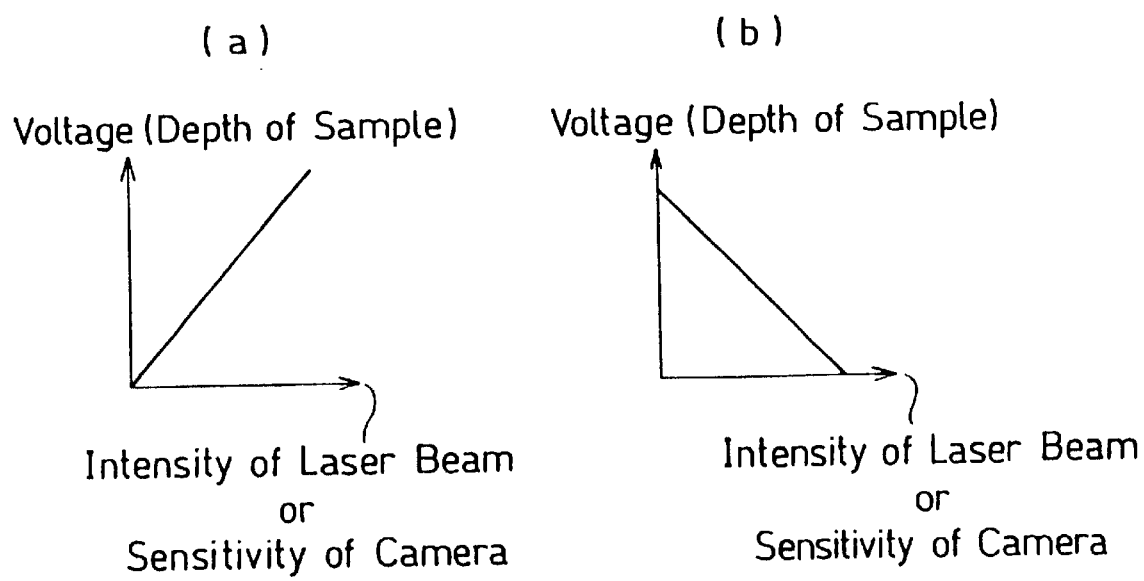
FIGS. 5(a) and 5(b) show the drawings indicating statuses of control for the intensity of the laser beam or the sensitivity of the camera.

With such a control mechanism, the intensity of the laser beam or the sensitivity of camera 30 may be increased as the piezoelectric element driving voltage increases, that is, as the depth of the confocal plane position (called sample depth) is increased as shown in drawing (a) of FIG. 5. Otherwise, the intensity of the laser beam or the sensitivity of camera 30 may be reduced as the sample depth is decreased as shown in drawing (b) of FIG. 5.

Figure 6:
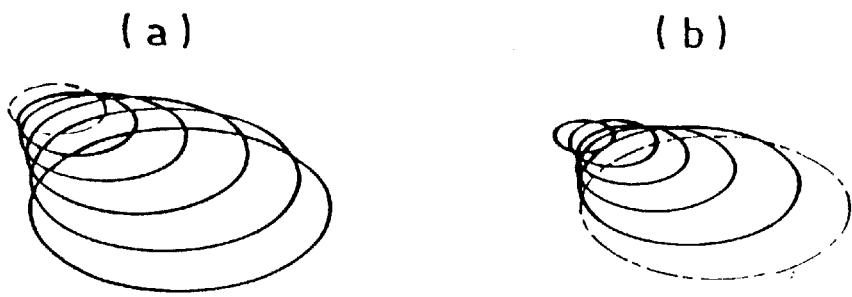
FIGS. 6(a) and 6(b) show conceptual drawings of sliced images corresponding to the statuses of control indicated in FIG. 5.

Drawing (a) of FIG. 6 conceptually indicates the sliced images obtained by the control as shown in drawing (a) of FIG. 5; drawing (b) of FIG. 6 conceptually indicates the sliced images obtained by the control as shown in drawing (b) of FIG. 5, respectively. In FIG. 6, the thickness of the solid line represents changing intensity of the laser beam or the sensitivity of camera 30.

Since humans receive a stereoscopic impression when the foreground is made bright and the depths dark, the implementation as described above enables an image display with a stereoscopic impression to be easily obtained.

In addition, the above description of the present invention is only illustrative for a specific preferred embodiment for the purpose of explanation and example. Accordingly, it is apparent that the present invention is not restricted by the above embodiment and can include many changes and modifications without departing from the spirit of the essential characteristics thereof.

As explained above, the present invention has the following effects:

According to the invention, images of large depth of focus can easily be obtained in real-time by scanning the objective lens at a speed equal to or higher than the one-image integrating time in the optical axis direction.

According to the invention, images without frame shift can be easily obtained by taking the scanning time of the objective lens as an integer multiple of the one-image integrating time.

According to the invention, a dynamic stereoscopic view can be achieved and images with a stereoscopic impression can be obtained by the following means:

scanning the objective lens at a speed equal to or higher than the one-image integrating time in the optical axis direction as well as scanning the relative position of the sample to the image pickup device in the direction perpendicular to the optical axis in synchronization with the above scanning of the objective lens in the optical axis direction.

According to the invention images with a stereoscopic impression having a front-to-rear relation can be obtained by the following:

increasing or decreasing the above intensity of the light beam or the sensitivity of the image pickup device corresponding to the position of the confocal plane as well as scanning the objective lens in the optical axis direction faster than the one-image integrating time. Accordingly, the invention has the effects described below. The confocal images of a sample reacting differently in the direction of depth can be measured in real-time. In addition, the trend of an observation target can always be grasped even if the target moves in the direction of depth provided it is in the range of capturing confocal images.

What is claimed is:

1. A confocal microscopic equipment capable of obtaining sliced images of a sample by scanning a surface thereof with a light beam using a confocal scanner and a movable objective lens, said equipment comprising:

actuator means for moving said objective lens in one optical axis direction and then in another opposite optical axis direction at a cyclical rate which is an integer multiple or fraction of 30 Hz so that a large depth of focus of said sample is obtained in real time and a clear stereoscopic impression of said sample is easily attained.

2. The equipment of claim 1, wherein said rate is at least 15 Hz.

3. The equipment of claim 1, wherein said rate is 1 Hz.

4. A confocal microscopic equipment capable of obtaining slide images of a sample by scanning a surface thereof with a light beam using a confocal scanner and a movable objective lens, said equipment comprising:

actuator means for moving said objective lens in one optical axis direction and then in another opposite optical axis direction at a cyclical rate which is an integer multiple or fraction of 30 Hz; and means for moving said sample in a direction perpendicular to said optical axis direction in correspondence with movement of said objective len in said optical axis direction by said actuator means, whereby a large depth of focus of said sample is attained in real time.

5. The equipment of claim 4, wherein said rate is 15 Hz.

6. The equipment of claim 4, wherein said rate is 1 Hz.

7. A confocal microscopic equipment capable of obtaining sliced images of a sample by scanning a surface thereof with a light beam using a confocal scanner and a movable objective lens, said equipment comprising:

actuator means for moving said objective lens in one optical axis direction and then in another opposite optical axis direction at a cyclical rate which is an integer multiple or fraction of 30 Hz; and control means for increasing or decreasing intensity of said light beam or sensitivity of an image pickup device in correspondence with movement of said objective lens in said optical axis direction by said actuator means;

whereby a large depth of focus of said sample is attained in real time.

8. The equipment of claim 7, wherein said rate is at least 15 Hz.

9. The equipment of claim 7, wherein said rate is 1 Hz.

* * * * *